July 10, 1956

R. D. MEYERS 2,754,457

TANK UNIT

Filed May 31, 1952

INVENTOR.
ROBERT D. MEYERS
BY
George H Fisher
ATTORNEY

July 10, 1956  R. D. MEYERS  2,754,457
TANK UNIT

Filed May 31, 1952  2 Sheets—Sheet 2

INVENTOR.
ROBERT D. MEYERS
BY
George H. Fisher
ATTORNEY

United States Patent Office 2,754,457
Patented July 10, 1956

2,754,457
TANK UNIT

Robert D. Meyers, Richfield, Minn., assignor to Minneapolis-Honeywell Regulator Company, Minneapolis, Minn., a corporation of Delaware Application May 31, 1952, Serial No. 290,957

5 Claims. (Cl. 317—246)

This invention is concerned with a sensing element for apparatus for measuring the quantity of a substance and particularly with a capacitive type of sensing element for fluid quantity measuring apparatus.

Apparatus for measuring fluid quantity has long been known in the art with the apparatus making use of the capacitive type of sensing element being considered the most accurate in that the signal indication is not affected by foaming of the fluid. The difference is dielectric constant between the fluid and the air affects the capacitance of the sensing element, or tank unit, to control the signal indication. The capacitance of the tank unit changes depending upon how much of the unit is immersed in the fluid and so gives an accurate indication of the height of the fluid in the container.

Even though the capacitance type of sensing element is the most accurate known in the art, it is subject to error when the indicator dial is calibrated to show the quantity of the fluid by weight in that change in dielectric constant of the fluid being measured is not always linear with change in density, and thus weight, over a range of temperature. Also, different fluids may have dielectric constants which do not vary linearly with the differences in density of the fluids. As a result, in order to increase the already high accuracy of the fluid measuring apparatus it is necessary to eliminate the effect of a change in the dielectric constant of the fluid and obtain a signal due to the height, or volume, of the fluid and its density. Apparatus for obtaining such an indication is described and claimed in the Hermanson application, Serial No. 265,010 filed January 4, 1952 and assigned to the same assignee as the present invention. Elimination of the effect of a change in the dielectric constant is accomplished through the use of a second tank unit which is completely immersed in the fluid. It is an object of this invention to design a single physical unit combining both the measuring tank unit and the compensating tank unit.

Another object of the invention is to design a single physical unit combining both the measuring tank unit and compensating tank unit which is light in weight.

A further object of the invention is to design a single physical unit combining both the measuring tank unit and compensating tank unit which has physical dimensions very nearly those of the measuring tank units known in the prior art.

Another object of the invention is to design a single physical unit combining both the measuring tank unit and compensating tank unit which is simple in design and easily constructed.

These and other objects and advantages are accomplished by placing the cylindrical electrodes comprising the compensating tank unit about the bottom end of the cylindrical electrodes comprising the measuring tank unit and parallel to them.

For a better understanding of the invention reference is had to the following detailed description taken in conjunction with the accompanying drawings, in which.

Figures 1, 2, 5:
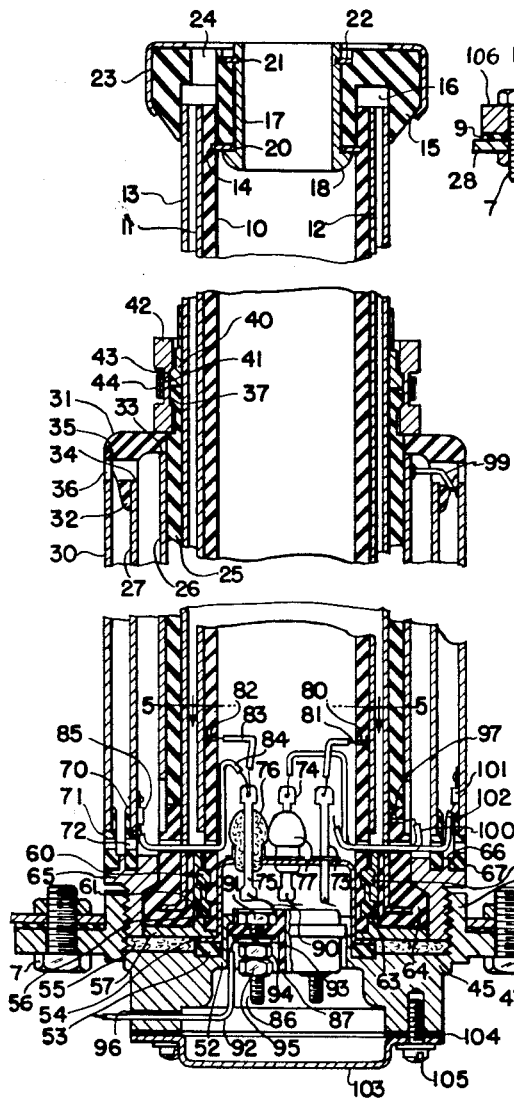
Figure 1 is a cross-sectional view of a flange mounted bottom mounted unit.
Figure 2 is a cross-sectional view of a flange mounted top mounted unit.
Figure 5 is a sectional view taken along line 5—5 of Figure 1 showing the portion of the unit including the connections of the conductor from the electrodes to the pins.
Figure 3:
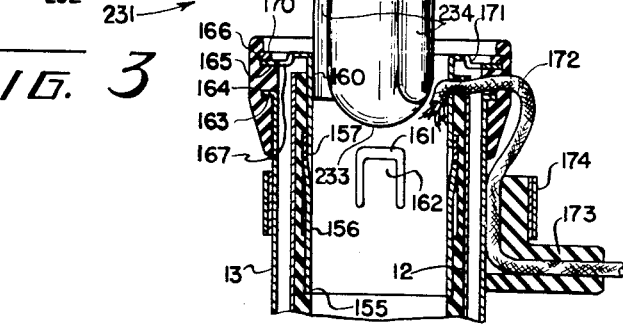
Figure 3 is a view, partly in cross-section, of an internally mounted unit.
Figure 6:
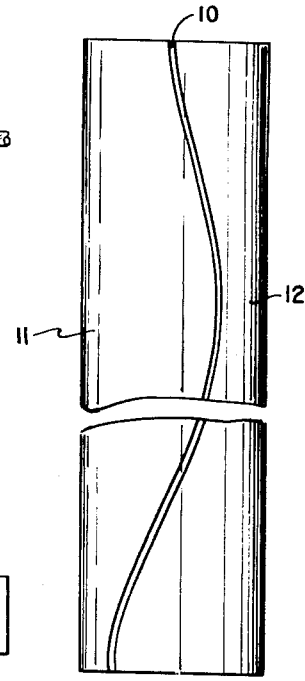
Figure 6 is a view of the inner electrode.

The unit shown in Figure 1 has a cylindrical insulator 10 over a portion of which is placed, preferably by plating an inner electrode 11 and over a further portion a second electrode 12 which is grounded. The measuring portion of the unit further has an outer electrode 13. The inner electrode 11 and outer electrode 13 comprise the measuring tank unit with the capacitance between these two electrodes varying with rise and fall of fuel in the tank. The comparative areas of the inner electrode 11 and the grounded electrode 12 are varied in accordance with the cross sectional area of the tank in which the unit is placed in order that the signal indication from the measuring tank unit be linear with change in the quantity of fuel in the tank. This type of construction is better shown and described in my application Serial No. 192,685, filed October 28, 1950, now Patent 2,741,124, and assigned to the same assignee as the present invention. A preferred modification of the measuring unit and the one which is intended to be used here, is shown in Figure 3 of the above mentioned application.

The upper end of the measuaring unit is held fixed with respect to its various components as follows:

A groove 14 is placed on the inner surface of the insulator 10 near its upper end. An insulator 15 having a groove 16 with an inner diameter equal to the inside diameter of the insulator cylinder 10 and an outside diameter equal to the outside diameter of the outer electrode 13 is fitted down onto a short rigid member 17 which has an outside diameter equal to the inside diameter of the insulator 15. The rigid member 17 is shown in the drawing to be made of a metal or alloy only because it is considered to be more rigid than material which is insulative. The member 17 has an outer lip 18 at its lower end which fits over the lower end of the insulator 15 and which has an outer diameter equal to the inside diameter of the insulative cylinder 10. The member 17, which is hollow is first fitted down into the top end of insulative cylinder 10 and a spring ring 20 is then fitted down into the groove 14 in the inner surface of the insulator 10. The insulator 15 is then fitted down over the end of the electrodes until it butts against the spring ring 20. At the upper end of hollow member 17 there is a groove 21 about its outer edge. The portion of capping insulator 15 which is adjacent this groove is cut back so that a spring ring 22 may be inserted into the groove and hold the capping insulator 15 rigidly with respect to member 17, which is held rigidly with respect to insulator 10 by means of spring ring 20. A metallic capping member 23 is then placed over the upper end of insulator 15 and is bent inwardly along the lower outer surface of capping insulator 15, which has a gradually decreasing diameter. By being bent inwardly along insulator 15 the metallic capping member 23 is then held rigidly with respect to the insulator 15. The purpose of the capping member 23 is to protect the edges of insulator 15. Because the groove in insulator 15 just fits over outer electrode 13 and cylindrical insulator 10, it holds these two components rigidly with respect to each other and thus holds inner electrode 11 and grounded electrode 12 rigidly with respect to outer electrode 13. Capping shell 23 is annular in shape, that is the center portion has been cut out to permit the free flow of air in and out of the center of the tank unit through the hollow rigid member 17. Various apertures, one of which is noted as 24, have been put into the insulator 15 from its upper end down to the groove 16 for the purpose of permitting free passage of air in and out between the outer electrode 13 and the inner electrode 11, and grounded electrode 12.

At the lower end of the unit and about the outer electrode 13 is placed the compensator unit. A cylindrical insulator 25 is placed about the lower end of outer electrode 13 and a first cylindrical electrode 26 is placed about this cylindrical insulator 25. The compensator unit is shown to have two further electrodes 27 and 30. At the upper end of the compensator unit is an annular insulator 31 which fits over the top of the inner compensator electrode 26 and which has a tongue 32 having an inside diameter equal to the outside diameter of compensator electrode 27. A shoulder 33 is provided on the lower surface of the insulator 31 against which butts the upper end of the inner compensator electrode 26. A shoulder 34 on the inside surface of the tongue 32 butts against the center electrode compensator electrode 27 and a third shoulder 35 on the lower surface of the annular insulator 31 butts against the upper end of outer compensator electrode 30. A number of holes 36 are cut through the upper end of outer compensator electrode 30 and the annular insulator 31 to provide free passage of air into and out of the spaces between the compensator electrodes if the fluid in the tank should fall below the level of the top of the compensator unit.

The insulator 25 extends upwardly beyond the ends of the compensator electrode and has an outwardly extending tongue 37. A conductive member 40 is placed about the outer measuring electrode 13 and is rigidly fixed thereto. This cylindrical member 40 has an outwardly extending tongue 41 at its lower end which has the same outer diameter as the outwardly extending tongue 37 of cylindrical insulator 25. The upper end of cylindrical insulator 25 and the lower end of cylindrical member 40 butt against each other. A split ring conductive member 42, which is cylindrical in shape and which has a groove 43 on its inner surface of a diameter equal to the outside diameter of the tongues 41 and 37 on members 40 and 25 respectively, is fitted over the tongues and then is clamped thereto by means of clamp 44 which may be similar in construction to the ordinary hose clamp.

The combination tank unit is mounted at its lower end and has a mounting head 45 having a flange 46 provided with mounting holes 47. Bolts 7 are passed through the mounting holes 47 and the bottom wall 8 of the tank into which the tank unit is inserted and the tank unit is fastened by this means to the tank. As shown in the drawing, the bottom of the tank is just above the flange 46. That is, the tank unit is inserted into the tank from below with the flange fitting up against the bottom of the tank. A sealing gasket 9 is compressed between the tank unit flange 46 and the lower tank wall 8 to prevent fuel from leaking out.

The mounting head 45 has an upwardly extending annular ridge 50 having a threaded inner surface. The mounting head has a further upwardly extending cylinder 52 which is closed at its upper end with the exception of sufficient apertures through which the conductors from the various electrodes pass. About the outer and lower edge of the upwardly extending cylinder 52 is placed a gasket 53. Above the gasket 53 is positioned an inverted cylindrical cup 54 having a lower flange which seats upon the gasket 53 and which has an inside diameter equal to the outside diameter of the upwardly extending cylinder 52 so as to fit over the upper end of the upwardly extending cylinder 52. The upper surface of the cup has apertures for the purpose of passing the conductors extending to the various electrodes. Cup 54 has an outside diameter equal to the inside diameter of cylindrical insulator 10 and fits up into the lower end of cylindrical member 10. An annular gasket 55 is positioned inside the annular ridge 50 inside its lower edge. An annular ring 56 having a lower flange 57 fits against the upper surface of gasket 55. The upper cylindrical portion of the annular ring 56 fits up over the end of insulator cylinder 10 and has a pair of inwardly extending grooves 60 and 61 which mate with a pair of inwardly extending grooves 62 and 63 on the outer surface of insulator 10. The annular ring 56 is held rigid with respect to insulator 10 and the area between the ring 56 and insulator 10 is then filled with a cement which hardens to hold the two components rigid with respect to each other.

The lower end of outer measuring electrode 13 has an insulator 64 molded about it with the insulator 64 being held firmly by the outwardly extending flange on the bottom end of the electrode 13. The insulator 64 has an inwardly extending shoulder on its outer surface. The insulator 64, with the outer electrode 13, is then positioned against the upper surface of the flange 57 of annular ring 56. An annular ring 65 having a downwardly extending cylindrical portion which is threaded on its outer surface is then threaded down into the upwardly extending annular ridge 50. The inner surface of annular ring 65 has an inwardly extending shoulder which butts against the shoulder on the outer surface of insulator 64. Thus, when the annular ring 65 is threaded down tightly into the annular ridge 50 of mounting head 45 it holds the insulator 64 and thus the outer measuring electrode 13 rigidly with respect to mounting head 45. Insulator 64 in turn holds the annular ring 56 rigidly with respect to the mounting head while the annular ring 56 holds the insulator cylinder, on which are plated the inner electrode 11 and grounded electrode 12 rigidly with respect to the mounting head 45. The upper end of insulator 64 outside the outer measuring electrode 13 butts against the lower end of cylindrical insulator 25 which positions outer measuring electrode 13 and inner compensator electrode 26 with respect to each other.

The upper surface of annular ring 65 has a groove 66 and an inwardly extending shoulder 67. A cylindrical insulator 70 is positioned in the groove 66 while a second cylindrical insulator 71 is positioned on the shoulder 67.

Cylindrical insulator 70 has a shoulder on its inner surface against which intermediate electrode 27 of the compensator tank unit is positioned. Cylindrical insulator 71 has a shoulder on its outer surface against which outer compensator electrode 30 butts. Cylindrical insulator 10, molded insulator 64, and cylindrical insulators 70 and 71 have a number of apertures 72 at the lower ends thereof for the purpose of permitting conductors to pass below the various electrodes to the space inside the cylindrical insulator 10 and also to permit the free passage of fluid into and out of the spaces between the electrodes with rise and fall of the fluid in the tank in which the tank unit is inserted.

As stated previously, the top surface of inverted cup 54 has a number of apertures to permit the passage of conductors from the various electrodes therethrough. A first pin 73 is shown to be directly fastened to the upper surface of the inverted cup 54. Pins 74 and 75 have glass beads 76 and 77 molded about them with the glass beads fitting into the apertures in the top surface of the cup. The glass beads are then securely fastened to the cup to hold the pins rigidly in place. A further pin is also passed through the cup in a manner similar to pins 74 and 75 but cannot be seen because of the tank unit being shown in cross-section. The pin 73 in being in direct contact with the cup 54 is at the same potential as the cup 54 and so is at the same potential as the mounting head 45.

The ground electrode 12 is connected to pin 73 by means of a pin 80 which passes through cylindrical insulator 10 to make contact with the electrode 12. Connected to the pin 80 is a conductor 81, the other end of which is connected to the upper end of pin 73.

Inner measuring electrode 11 is connected to a connecting pin 82 which passes through cylindrical insulator 10 to make contact with the inner electrode 11. Contact 82 is connected to the upper end of pin 75 by means of conductor 83. Also connected to the upper end of pin 75 is the intermediate electrode 27 by means of conductor 84. Conductor 84 is shown to be connected to the intermediate compensator electrode 27 by means of a riveted connection 85, though it is understood that any suitable means of making connection may be used.

The lower end of pin 75 is connected to a mounting bolt 86. Mounting bolt 86 is positioned within an annular insulator 87 which fits into an aperture in the upper closed surface of annular cylinder 52. The annular insulator 87 is counter-sunk at both ends. Pin 75 is connected to the upper end of mounting bolt 86 by conductor 90 which is snugged against the bolt 86 by nut 91. A conductor 92 has one end thereof snugged against the lower portion of mounting bolt 86 within the upwardly counter-sunk end of insulator 87 by means of washer 93 and bolts 94 and 95. The other end of conductor 92 extends through an aperture 96 in mounting head 45 to be connected into the rest of the fluid measuring circuit. It is understood of course that a plug type of connection could be made to conductor 92 rather than having it pass freely through the aperture 96.

Outer measuring electrode 13 is shown to be connected to a pin 97 which extends through the molded insulator 64 with the pin 97 being connected to a conductor 100, the other end of which makes contact with pin 74.

Outer compensator electrode 30 is shown to be connected by riveted connection 101 to a conductor 102, the other end of which makes connection with the fourth pin, above mentioned, though not shown. Inner compensator electrode 26 makes connection with outer compensator electrode 30 by means of conductor 99.

The various conductors such as conductor 84, 100 and 102 are shown to pass through the apertures 72 into the space within cylindrical insulator 10. The connections from pins 73, 74 and the pin which is not shown are made to mounting bolts in the same manner as pin 75 is connected to mounting bolt 86. The connections from these additional mounting bolts to the remainder of the circuit are made in the same manner as mounting bolt 86 is connected to the remainder of the circuit.

The space within mounting head 45 which contains the lower ends of the mounting bolts is covered over by a cover plate 103 which is placed over the end of mounting head 45. In order to make the connection fluid tight a gasket 104 is placed between the lower face of mounting head 45 and cover 103. Cover 103 is then connected to the mounting head 45 by means of bolts 105.

Figure 5 is a cross-sectional view looking down upon the connections of the various conductors from the different electrodes to the pin, and shows the fourth pin 78 to which the outer compensator electrode 30 is connected by means of conductor 102.

It is seen that a complete physically unitary unit combining both a measuring tank unit and a compensator tank unit has been described with the two tank units, though electrically isolated from each other, capable of being handled as a single unit. By using this type of unit only one hole need be made in the bottom of a tank for insertion of the unit and the amount of handling is cut at least in half over the work which would be required were the two tank units physically separate.

Modification of Figure 2

In the modification of Figure 2 many of the components are the same as those shown in Figure 1 and so will be designated by the same reference characters.

In the modification of Figure 2 the unit is a top-mounted unit which fits into a hole in the top wall 28 of the tank with the flange 106 of the mounting head 107 fitting on the top of the tank. Bolt holes 110 are provided for fastening the unit to the tank by means of bolts 7. The mounting head 107 has a downwardly extending cylindrical portion 111 with an inwardly extending shoulder against which the upper end of insulated cylinder 10 butts. The lower portion of the downwardly extending cylindrical portion 111 of mounting head 107 has the same outside diameter as the inside diameter of the upper end of insulative cylinder 10 and extends downwardly into the upper end of insulative cylinder 10 to hold the insulative cylinder and thus the inner measuring electrode 11 and the grounded electrode 12 rigidly with respect to the mounting head 107.

The upper end of outer measuring electrode 13 is flanged outwardly as shown by flange 19 and insulator 112 is molded about the flanged end of outer measuring electrode 13 with the insulator 112 extending downwardly along the outer surface of the electrode. Insulator 112 has an inwardly extending shoulder 113.

The mounting head 107 has a downwardly extending cylindrical portion 114 which has an inside diameter equal to the outside diameter of molded insulator 112. The lower end of cylindrical portion 114 is bent inwardly against the shoulder 113 of the molded insulator 112 to hold the insulator 112 and thus the outer measuring electrode 13 rigidly with respect to the mounting head 107.

The connection of the upper end of the compensator unit to the measuring tank unit is the same as is shown and described in the modification of Figure 1.

At the lower end of the measuring and compensator tank units is a hollow cylindrical member 115 having an annular portion 116 which has an outside diameter equal to the inside diameter of the cylindrical insulator 10. A portion 117 below the portion 116 of the cylindrical member 115 extends outwardly and has an outside diameter equal to the outside diameter of outer measuring electrode 13. An upper portion 120 of cylindrical member 115 has an outside diameter substantially less than the inside diameter of cylindrical insulator 10. Cylindrical member 115 is fitted up into the lower end of cylindrical insulator 10 until the bottom end of insulator 10 butts against the portion 117 of cylindrical member 115.

Cylindrical insulator 25a which corresponds to cylindrical insulator 25 in the unit shown in the Figure 1, extends downwardly past the lower end of outer measuring electrode 13 and inner compensator electrode 26 and has an inwardly extending shoulder 121 at its lower end. The compensator unit is passed up around the lower end of outer electrode 13 until the shoulder 121 of cylindrical insulator 25a butts against the cylindrical member 115.

An annular member 122 positions the lower ends of insulators 70 and 71 in the same manner as does the annular ring 65 in the unit of Figure 1. The inside surface of annular ring 122 has an outwardly sloping shoulder which butts against a corresponding shoulder of cylindrical insulator 25a to hold the annular ring 122 rigidly with respect to the rest of the unit.

A conductor 123 connects the annular ring 122 with cylindrical member 115 to hold both members at the same potential.

In the modification of Figure 2, the intermediate compensator electrode 27 is connected by means of riveted connection 85 and conductor 84 to a pin 124 which passes through cylindrical insulator 10 to make contact with inner measuring electrode 11. The inner compensator electrode and outer compensator electrode, which are connected together through conductor 99, are connected to a pin 125 by means of conductor 126 and riveted connection 127.

Outer measuring electrode 13 is fastened to a bolt 130 which has a flange 131 in contact with outer measuring electrode 13. The bolt 130 is fastened to electrode 13 by being molded to outer measuring electrode 13 by molded insulator 112. Bolt 130 extends through an aperture 132 into the space within mounting head 107 above the downwardly extending portion 111.

The downwardly extending portion 111 has three apertures for three connecting bolts to make connection between the various electrodes in the measuring and compensator tank units and the space within the mounting head above the downwardly extending cylindrical portion 111. The three bolts 133, 134, and 135 are insulated from the downwardly extending cylindrical portion 111. Bolt 133 is shown to be insulated from cylindrical portion 111 by insulators 136 and 137. Insulative ring 140 between the two insulators makes a fluid tight seal.

At a short distance below the bottom surface of cylindrical member 111 is a conductive apertured disc 141, the apertures being for the purpose of passing the bolts 133, 134, and 135 through the disc. Below the conductive disc 141 is an apertured insulative disc 142 and below that is an apertured conductive disc 143. A pin 144 extends through cylindrical insulator 10 to make connection between inner measuring electrode 11 and conductive disc 143 while a pin 145 extends through the cylindrical insulator 10 to make connection between grounded electrode 12 and conductive disc 141.

The apertures in discs 142 and 143 correspond to the apertures in disc 141 to permit the passage of the bolts. Bolt 133 is insulated from conductive disc 141 by means of an annular insulator 146 but the aperture in conductive disc 143 is small enough so that the disc fits snugly about the bolt 133 as the bolt passes through the disc so that good electrical contact is made between the disc 143 and the bolt 133.

Bolt 135 is insulated from conductive disc 143 by means of annular insulator 147 while it makes good electrical contact with conductive disc 141. Bolt 134 is insulated from both conductive discs 141 and 143 by means of annular insulators 150 and 151.

Pin 125, which is mechanically connected to cylindrical member 115, is connected by means of conductor 152 to bolt 134. The conductor 152 is shown to make connection with the bolt 134 by means of nuts 153 and 154 which are threaded onto the bottom end of bolt 134.

Though not shown, conductors are connected to the upper ends of bolts 130, 133, 134 and 135 by means of nuts with the conductors passing through apertures or connectors in the side of mounting head 107.

There has now been described and shown a combination measuring tank unit and compensator tank unit which may be handled as a single physical unit and be mounted from the top of a tank.

*Modification of Figure 3*

The modification of Figure 3 shows an integral type unit, that is, a unit which is intended to be mounted entirely within a tank. Here again, a number of the components are the same as shown in Figures 1 and 2 and so will be designated by the same reference characters.

On the inner surface of cylindrical insulator 10 near its upper end is an inwardly extending shoulder 155 such that the inner diameter of the insulator 10 above this shoulder is greater than the inside diameter below it. Above the inwardly extending shoulder 155 in insulator 10 is a groove 156 having a ring 157 positioned at its upper end.

A cylindrical member 160 fits inside cylindrical insulator 10 and butts against shoulder 155. Portions of cylinder 160 are cut away, as at 161, resulting in a number of upwardly extending fingers 162. These fingers are bent outwardly once the cylinder 160 has been inserted into insulator 10 so that the fingers 162 butt against the lower edge of ring 157 to hold the cylinder 160 rigidly with respect to cylindrical insulator 10.

Outer measuring electrode 13 has an outwardly extending flange 163 about which is molded an annular insulator 164. The inner surface of the molded insulator 164 above the flange 163 of outer measuring electrode 13 has the same diameter as the inside diameter of the measuring electrode 13. The upper inner surface of molded insulator 164 has an inwardly extending shoulder 165 such that the portion of the insulator 164 above the shoulder 165 has a larger inside diameter than the central portion of the insulator. The portion of the inner surface of insulator 164 above the shoulder 165 has a groove 166.

Cylindrical member 160 has an outwardly extending flange 167 at its upper end. The outside diameter of the flange is the same as the inside diameter of insulator 164 above shoulder 165. After the cylindrical insulator 10, on which are inner measuring electrode 11 and grounded electrode 12 and to which cylindrical member 160 has been fastened, is inserted into outer measuring electrode 13 a spring ring 170 is inserted in the groove 166 in molded insulator 164 just above the upper surface of flange 167 to hold the cylindrical member 160, and thus cylindrical insulator 10 and inner measuring electrode 11 and grounded electrode 12, rigidly with respect to outer measuring electrode 13.

Flange 167 of cylindrical member 160 has a number of apertures 171 to permit the free passage of air in and out of the area between outer measuring electrode 13 and inner measuring electrode 11 and grounded electrode 12.

The means of fastening the upper portion of compensator tank unit to the measuring tank unit is the same as has been described for the unit shown in Figure 1.

The structure of the lower ends of the measuring tank unit and compensator tank unit is similar to the structure at the lower end of the measuring tank unit and compensator tank unit shown in Figure 2 with the following exceptions. Whereas in the modification of Figure 2 the electrical connections to the grounded electrode 12, the inner measuring electrodes 11, and the outer measuring electrode 13 were made at the upper ends of the electrodes the electrical connections to the various electrodes in the unit shown in Figure 3 are made at the lower end with the conductors from various electrodes passing through the apertures in the various insulators to the area within the cylindrical insulator 10. However, instead of the conductors being connected to various pins, as is shown in modification Figure 1, the conductors are wrapped together to form a single cord 172 which passes through apertures in cylindrical insulator 10 and molded insulator 164 at the upper end of the unit above the end of outer measuring electrode 13 with the cord then being rigidly fastened to the unit by being passed through an insulator 173 which is shaped to fit about a portion of outer measuring electrode 13 and which has an aperture through the insulator for the purpose of passing the cord. The insulator 173 is then rigidly fastened to outer measuring electrode 13 and thus the entire unit, by means of a hose type clamp 174.

The mounting of the unit in the tank may be done by means of a mounting 231 having a base 232 cemented to the top wall 28 of the tank. A downwardly extending finger 233 would be intended to fit snugly within cylindrical member 115, by means of ridges 234 on the finger 233 to hold the upper end of the unit against lateral movement. The lower end of the unit could be clamped to a supporting mounting 235 within the tank to hold the entire unit rigidly with respect to the tank. The base 236 of the mounting 235 would be cemented to the lower tank wall 8. The superstructure of the mounting is semicircular and comprises a lower portion 237 about the bottom of the tank unit and having an inside diameter sufficient to allow drainage through the drain holes 72 and an upper portion 240 which fits snugly around the outside of the tank unit. The tank unit is fastened to the mounting 235 by means of a hose type clamp 241 which passes about the tank unit and the upper portion 240.

Figure 4:
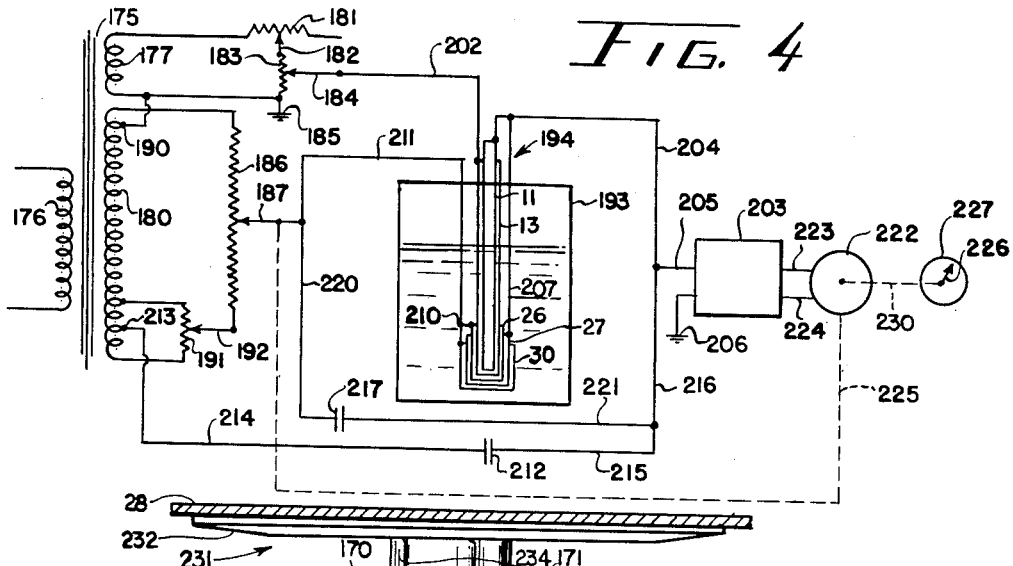
Figure 4 is a schematic diagram of a circuit in which a unit of this type could be used.

This type of combination measuring tank unit and compensating tank unit may be used in a circuit such as is shown in Figure 4 for measuring the weight of fluid in a tank. The circuit shown in Figure 4 is electrically the same one as is shown in the application of Franzel et al., Serial No. 200,258 filed December 11, 1950, and assigned to the same assignee as the present invention. As stated in the above mentioned Franzel et al. application the advantage of this type of circuit which includes a compensator tank unit, is to tend to neutralize the effect upon the measuring tank unit of changes in dielectric constant between various fluids and of the same fluid at different temperatures in order that a truer weight indication of the quantity fluid in the tank may be obtained. Briefly, the circuit is energized by a transformer 175 having a primary 176 connected to a source of power, not shown. Transformer 175 has a first secondary 177 and a second secondary 180.

A rheostat 181 having a wiper arm 182 has one terminal thereof connected to a first terminal of transformer secondary 177. The wiper arm 182 of rheostat 181 is connected to one end of a potentiometer 183 having a wiper arm 184. The second terminal of potentiometer 183 is connected to the second or lower terminal of transformer secondary 177 and is also connected to ground terminal 185.

The upper terminal of transformer secondary 180 is connected to the upper terminal of a potentiometer 186 having a wiper arm 187. A tap 190 near the upper end of transformer secondary 180 is connected to the ground terminal 185.

A potentiometer 191, having a wiper arm 192, is connected across the lower end of transformer secondary 180. The wiper arm 192 of potentiometer 191 is connected to the lower terminal of potentiometer 186.

A tank 193 containing fluid to be measured has inserted therein a combination measuring tank unit and compensator tank unit 194. The measuring tank unit comprises an inner measuring electrode 11 and an outer measuring electrode 13. The compensator tank unit comprises an inner compensator electrode 26, an intermediate compensator electrode 27 and an outer compensator electrode 30.

The wiper arm 184 of potentiometer 183 is connected to outer measuring electrode 13 by means of conductor 202. The inner measuring electrode 11 is connected to an amplifier 203 by means of conductors 204 and 205. The second input terminal of amplifier 203 is connected to ground terminal 206. Intermediate compensator electrode 27 is connected to inner measuring electrode 11 by means of conductor 207. The inner compensator electrode 26 and outer compensator electrode 30 are connected together at junction 210 which is then connected to wiper arm 187 of potentiometer 186 by means of conductor 211.

A capacitor 212 has one plate thereof connected to a tap 213 near the lower end of transformer secondary 180 by means of a conductor 214 while the other plate of capacitor 212 is connected to the ungrounded terminal in the input circuit of amplifier 203 by means of conductors 215, 216 and 205. The purpose of capacitor 212 is to introduce into the input circuit of amplifier 203 a signal indication which is equal in magnitude but opposite in phase to the signal indication into the input circuit of amplifier 203 of the measuring tank unit when the tank 193 is empty. Thus, the signal indication capacitor 212 neutralizes the empty tank capacitance signal indication of the measuring tank unit.

A capacitor 217 is connected to wiper arm 187 of potentiometer 186 by means of conductor 220 while the other plate of capacitor 217 is connected to the ungrounded terminal of the input circuit of amplifier 203 by means of conductors 221, 216, and 205. As previously stated, the inner and outer compensator electrodes are also connected to wiper arm 187 of potentiometer 186 while the intermediate compensator electrode 200 is connected to the input circuit of amplifier 203 by means of conductor 207, 204, and 205. Thus it is seen that the compensator tank unit is in parallel with capacitor 217.

Amplifier 203 is connected to a motor 222 by means of conductors 223 and 224. Motor 222 is connected by means of mechanical connection 225 to wiper arm 187 of potentiometer 186 for rebalancing purposes. Motor 222 is also connected to an indicator needle 226 of indicator dial 227 by means of mechanical connection 230.

In operation the signal indications due to capacitors 212, 217 and the compensator tank unit are opposite in phase to the signal indication due to the measuring tank unit. When the resultant signal on the input circuit of amplifier 203 is not equal to zero the amplifier 203 is energized to cause operation of motor 222 and move wiper arm 187 along potentiometer 186 until the various signal indications balance each other out. Since the signal indication due to capacitor 212 balances out the signal indication of the measuring tank unit when there is no fluid in the tank it is seen that the remaining signal indication due to the measuring tank unit is that signal which is due to fluid in the tank. This signal is balanced out by the signal indications due to capacitor 217 and the compensator tank unit when the circuit is in balance. Since the compensator tank unit is in parallel with capacitor 217 the capacitance of the compensator tank unit affects the total resultant capacitance of capacitors 217 and the compensator tank unit. As a result, any change in dielectric constant of the fluid in the tank 193 affects the total resultant capacitance of capacitor 217 and the compensator tank unit. The capacitance of the measuring tank unit which is due to the fluid in the tank is determined by the height of the fluid as well as the dielectric constant of the fluid. As a result, any change in dielectric constant of the fluid is partially compensated for but is not completely compensated for because the capacitance of capacitor 217 remains constant. The amount of compensation is determined by the ratio of capacitance between the compensator tank unit and capacitor 217. The circuit shown in Figure 4 and the manner and theory of operation is, as stated above, more fully described in the Franzel et al. application.

The circuit as shown in the Franzel et al. application shows two separate physical units for the measuring tank unit and the compensator tank unit. This would involve mounting two separate units in a tank. By the use of applicant's unit it is necessary to mount only one physical unit in a tank with the attendant savings in labor and a reduction in the number of holes necessary in a tank if the flange mounted units should be used.

There has been shown and described an improved type of structure of a unit which has use in an already known and existing circuit with the attendant advantages being pointed out. While several preferred modifications have been shown and described it is understood that other modifications may be made by those skilled in the art without departing from the spirit of the invention and therefore it is intended that the scope of the invention be limited only to the extent of the appended claims.

I claim:

1. A capacitance type liquid level sensing element for use with a capacitance bridge network for measuring the quantity of a fluid in a container, comprising in combination: a first plurality of concentric tubes of such length as to extend throughout the height of the portion of a container in which it is desired to measure the fluid quantity, said tubes comprising the electrodes of a capacitor, the capacitance of which is affected by the height and dielectric constant of the fluid between the electrodes, said first plurality of concentric tubes having an outer tube, a pair of terminals for said first capacitor adapted to be connected to a first leg of the bridge network; a second plurality of concentric tubes comprising the electrodes of a second capacitor, the capacitance of which is affected only by the dielectric constant of the fluid in the container, said second plurality of concentric tubes having an inner tube, an intermediate tube, and an outer tube, means connecting said inner and outer tubes to form an electrostatic shield for said intermediate tube, a pair of terminals for said second capacitor adapted to be connected to a second leg of the bridge network; and an insulator of substantially cylindrical shape mounted on the lower end of the outer tube of said first plurality of tubes, said second plurality of tubes being mounted on said insulator with said insulator completely occupying the space between the outer tube of said first plurality of tubes and the inner tube of said second plurality of tubes, apertures being provided to permit rise and fall of fluid between the tubes of said first and second plurality of tubes with the rise and fall of fluid in the container.

2. A capacitance type sensing element for use with a capacitance bridge having a measuring leg and a dielectric constant compensation leg, which bridge is used for measuring the quantity of fuel in a fuel tank comprising; a first capacitor having a first elongated conductive member comprising a first electrode of said first capacitor and a second elongated conductive member spaced from said first member and comprising a second electrode of said first capacitor, a pair of terminals connected to said first and second electrodes of said first capacitor and adapted to be connected to the measuring leg of the bridge, the capacitance value of said first capacitor being indicative of the quantity of fuel in the tank and the dielectric constant of the fuel; a second capacitor having a third conductive member comprising a first electrode of said second capacitor and having fourth and fifth conductive members electrically connected and spaced on opposite sides of said third conductive member to form an electrostatic shield for said third member, said fourth and fifth conductive members comprising a second electrode of said second capacitor, a terminal connected to said second electrode of said second capacitor and adapted to be connected to the compensation leg of the bridge; the capacitance value of said second capacitor being indicative of the dielectric constant of the fuel, means insulatively connecting said second capacitor at one end of said first capacitor such as to form a single physically unitary unit and prevent coaction between said capacitors; and electrical connection means connecting the first electrode of said second capacitor with one of the electrodes of said first capacitor.

3. A capacitive type sensing element for use with a capacitance bridge for measuring the quantity of fuel in a fuel tank comprising: a first capacitor having a first elongated conductive cylinder comprising a first electrode of said first capacitor and a second elongated conductive cylinder of greater diameter than said first cylinder mounted concentric with said first cylinder and comprising a second electrode of said first capacitor, a pair of terminals connected to said first and second cylinders of said first capacitor and adapted to be connected to one leg of the bridge, the capacitance of said first capacitor being a function of the quantity of fuel in the tank and the dielectric constant of the fuel; a cylindrically shaped insulator of relatively short length mounted on the lower end of said second cylinder on the outer surface thereof; a second capacitor having a third conductive cylinder comprising a first electrode of said second capacitor mounted on said insulator so that said insulator completely occupies the space between said second and third cylinders to prevent coaction between the said second and third cylinders; a fourth conductive cylinder of greater diameter than said third cylinder mounted concentric with said third cylinder and comprising a second electrode of said second capacitor, a further conductive cylinder of greater diameter than said fourth cylinder mounted concentric with said third cylinder and electrically connected thereto to form an electrostatic shield for said fourth cylinder, a pair of terminals connected to said third and fourth cylinders of said second capacitor and adapted to be connected to a second leg of the bridge, the capacitance of said second capacitor being a function of only the dielectric constant of the fuel.

4. A capacitance sensing element for use with an electrical network having a measuring portion and a dielectric compensation portion for measuring the quantity of fluid in a container, comprising in combination: a first plurality of concentric tubes of such length as to extend throughout the height of the portion of a container in which it is desired to measure the fluid quantity, said tubes comprising the electrodes of a first capacitor, the capacitance of which is affected by the height and dielectric constant of the fluid between the electrodes, said capacitor having means adapted to be connected to the measuring portion of the network; a second plurality of concentric tubes of relatively short length comprising the electrodes of a second capacitor, said second capacitor having means adapted to be connected to the compensation portion of the network; an insulator of relatively short length completely surrounding the outer tube of said first plurality of concentric tubes at the lower end thereof, and means mounting said second plurality of concentric tubes on said insulator so that said insulator completely ocupies the space between the outer tube of said first plurality of tubes and the inner tube of said second plurality of tubes to thereby prevent coaction between said first and second capacitors and to thereby position said second capacitor at a low point in the container so that its capacitance is affected substantially only by the dielectric constant of the fluid in the container.

5. A capacitive type sensing element for use with a bridge network having a measuring leg and a dielectric constant compensation leg, which network is for use for measuring the quantity of fuel in a fuel tank comprising: a first capacitor having a first elongated conductive cylinder comprising an outer electrode of said first capacitor and a second elongated conductive cylinder concentric with said first cylinder and comprising an inner electrode of said first capacitor, terminal means connected to said first and second cylinders of said first capacitor and arranged to be connected to the measuring leg of the bridge network, the capacitance of said first capacitor varying as the quantity of fuel in the tank varies and as the dielectric constant of the fuel varies; a cylindrically shaped insulator of relatively short length mounted on the lower end of said outer electrode on the outer surface thereof; a second capacitor having a third conductive cylinder comprising an inner electrode of said second capacitor mounted on said insulator so that said insulator completely occupies the space between said outer electrode of said first capacitor and said inner electrode of said second capacitor to thereby prevent coaction between said capacitors, said second capacitor also having a fourth conductive cylinder mounted with said third cylinder and comprising an outer electrode of said second capacitor, terminal means connected to one of said third and fourth cylinders of said second capacitor and arranged to be connected to the compensation leg of the bridge network, the capacitance of said second capacitor varying only as the dielectric constant of the fuel varies and electrical connection means connecting the other of said third and fourth cylinders of said second capacitor with one of the electrodes of said first capacitor.

References Cited in the file of this patent

UNITED STATES PATENTS

| 2,582,400 | Smith | Jan. 15, 1952 |
| 2,599,583 | Robinson et al. | June 10, 1952 |
| 2,622,442 | Bois Blanc et al. | Dec. 23, 1952 |

FOREIGN PATENTS

| 114,980 | Sweden | Sept. 18, 1945 |
| 938,682 | France | Apr. 12, 1948 |